(12) United States Patent
Ramalingam et al.

(10) Patent No.: US 10,187,428 B2
(45) Date of Patent: Jan. 22, 2019

(54) IDENTIFYING DATA USAGE VIA ACTIVE DATA

(71) Applicant: Amazon Technologies, Inc., Seattle, WA (US)

(72) Inventors: Harsha Ramalingam, Kirkland, WA (US); Dominique Imjya Brezinski, Henderson, NV (US); Jesper Mikael Johansson, Redmond, WA (US); Jon Arron McClintock, Seattle, WA (US); James Connelly Petts, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/618,419

(22) Filed: Jun. 9, 2017

(65) Prior Publication Data

US 2017/0279854 A1 Sep. 28, 2017

Related U.S. Application Data

(63) Continuation of application No. 14/227,845, filed on Mar. 27, 2014, now Pat. No. 9,705,920.

(60) Provisional application No. 61/928,972, filed on Jan. 17, 2014.

(51) Int. Cl.
*H04L 29/06* (2006.01)
*G06F 21/14* (2013.01)
*G06F 21/54* (2013.01)
*G06F 21/55* (2013.01)

(52) U.S. Cl.
CPC ............. *H04L 63/20* (2013.01); *G06F 21/14* (2013.01); *G06F 21/54* (2013.01); *G06F 21/55* (2013.01); *H04L 63/1491* (2013.01)

(58) Field of Classification Search
CPC ....................................... H04L 63/20
See application file for complete search history.

(56) References Cited

U.S. PATENT DOCUMENTS

| 6,931,540 B1 * | 8/2005 | Edwards | G06F 21/566 713/165 |
| 9,152,808 B1 | 10/2015 | Ramalingam et al. | |
| 2002/0138727 A1 | 9/2002 | Dutta et al. | |
| 2003/0142127 A1 * | 7/2003 | Markel | H04N 21/235 715/738 |
| 2006/0075103 A1 * | 4/2006 | Cromer | G06Q 10/10 709/225 |
| 2007/0113090 A1 | 5/2007 | Villela | |
| 2007/0192623 A1 | 8/2007 | Chandrasekaran | |
| 2007/0268297 A1 | 11/2007 | Novosad | |
| 2008/0040806 A1 * | 2/2008 | Kotzin | G06F 21/57 726/26 |

(Continued)

*Primary Examiner* — Andrew C Georgandellis
(74) *Attorney, Agent, or Firm* — Thomas Horstemeyer, LLP

(57) ABSTRACT

Disclosed are various embodiments for active data that tracks usage. The active data includes instructions that are executable by a computing device. The computing device is scanned to identify characteristics of the computing device. The characteristics of the computing device are utilized to determine whether the usage of the active data is authorized. Data is transmitted to a network service, including identifying information for the particular computing device and data that identifies a deployment of the active data.

20 Claims, 7 Drawing Sheets

(56) References Cited

U.S. PATENT DOCUMENTS

| | | |
|---|---|---|
| 2009/0051507 A1 | 2/2009 | Outlaw et al. |
| 2010/0077483 A1 | 3/2010 | Stolfo et al. |
| 2013/0097696 A1* | 4/2013 | Baker ................ H04L 63/1441 726/17 |
| 2014/0230024 A1* | 8/2014 | Uehara ............... H04L 63/1433 726/4 |

* cited by examiner

IDENTIFYING DATA USAGE VIA ACTIVE DATA

CROSS-REFERENCE TO RELATED APPLICATIONS

This application claims priority to co-pending U.S. application Ser. No. 14/227,845, entitled "IDENTIFYING DATA USAGE VIA ACTIVE DATA," and filed on Mar. 27, 2014, which claims priority to U.S. Provisional Application No. 61/928,972, entitled "IDENTIFYING MALICIOUS ACTIVITY VIA ACTIVE DECOY DATA," and filed on Jan. 17, 2014, each of which are incorporated herein by reference in their entireties.

BACKGROUND

In an age of information, data stores to store and access information are ubiquitous. Some information may be confidential with only a limited number of parties granted access to the information. However, identifying unauthorized access or use of the information may not always be possible.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
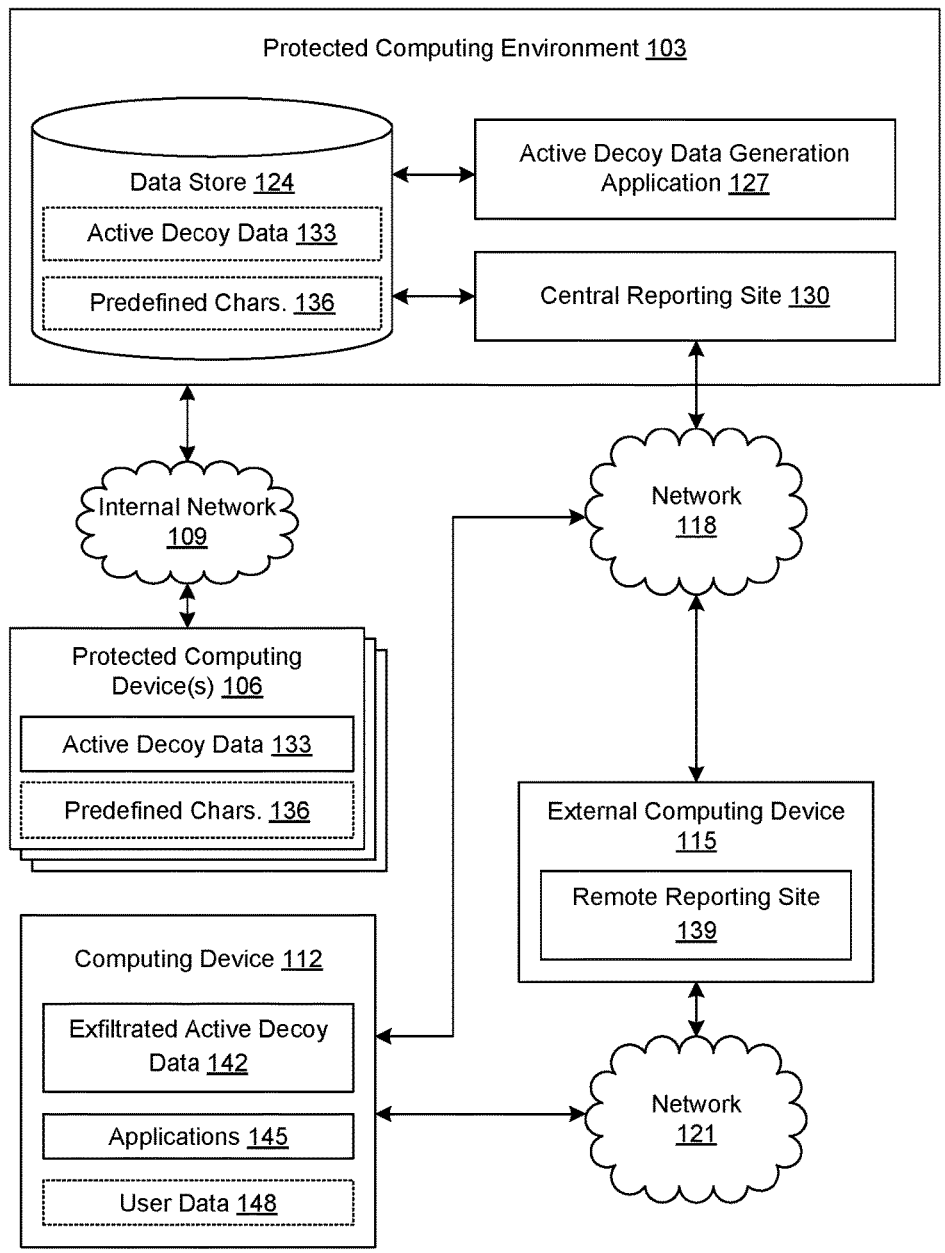
FIG. 1 is a schematic block diagram of a networked environment according to various embodiments of the present disclosure.

The present disclosure relates to identifying malicious activity or other data usage through the use of active data that includes executable instructions. Despite using best efforts for network security, such as security credential management, privilege separation for users, protective firewalls, and so on, malicious users may still gain access to a network. In some cases, such users may be internal users with some level of authorized access. In other cases, such users may be external and may nonetheless be able to exploit one or more network security vulnerabilities via so-called "zero-day" exploits or otherwise unknown exploits. Consequently, malicious users may exfiltrate, or steal, protected data from within the network for malicious purposes. For example, malicious users may steal personal information of users, payment information, company confidential information, and/or other information.

Various embodiments of the present disclosure recognize that protected data may still be exfiltrated in spite of the use of network security best practices. Accordingly, decoy data may be deployed within a secured network environment. Decoy data may resemble ordinary protected data, but as will be described, the decoy data may be used to track and identify malicious uses. For example, the decoy data may be data that is never expected to leave the secured network. The decoy data may have a non-decoy purpose or may be used purely as a decoy to attract use by malicious users.

Passive decoy data may refer to non-executable decoy data that is not expected to leave the secured network. Sentinel services may be deployed to examine data on communications links to detect unauthorized transfers of the passive decoy data. Various techniques for using passive decoy data are described in U.S. patent application Ser. No. 13/849,772, entitled "ADAPTING DECOY DATA PRESENT IN A NETWORK," and filed on Mar. 25, 2013, which issued as U.S. Pat. No. 9,152,808 on Oct. 6, 2015, which is incorporated herein by reference in its entirety.

Various embodiments of the present disclosure relate to decoy data that is at least partially active, i.e., decoy data that includes executable instructions. The decoy data may be designed to appeal to unauthorized individuals by including one or more predetermined features configured to entice an unauthorized individual to access the decoy data. The decoy data may include executable instructions that are wrapped so that functionality associated with the executable instructions is unidentifiable or at least obfuscated. In place of sentinel services that scan for the transmission of decoy data, the active decoy data itself is instrumented to include logic that detects whether the active decoy data has been exfiltrated. If the active decoy data determines that it has been exfiltrated, the active decoy data may initiate transmission of an alert or notification to a central reporting site. The alert or notification may include identifying information to aid the investigation of the exfiltration.

As a non-limiting example, suppose that a malicious user gains access to a protected computing system. Stored in a file system of the protected computing system may be a file named "credit_cards.pdf," which is stored in a version of the Portable Document Format (PDF) that allows for executable code. The malicious user may view or open the PDF file within the protected computing system and may determine that it is a valuable file worth exfiltrating for future use. The malicious user then transfers the PDF file to another computing system, e.g., his or her personal computing system or another computing system that has been compromised. Upon opening this file on the other computing system, instructions within the PDF file may determine that an exfiltration has occurred and may cause a notification to be sent to a central reporting site. The notification may include, for example, the internet protocol (IP) address of the other computing system, geographic coordinates of the other computing system, a unique identifier of the other computing system (e.g., International Mobile Station Equipment Identity (IMEI), etc.), user account identifiers, and/or other identifying information. In the following discussion, a general description of the system and its components is provided, followed by a discussion of the operation of the same.

With reference to FIG. 1, shown is a networked environment 100 according to various embodiments. The networked environment 100 includes a protected computing environment 103 in data communication with one or more protected computing devices 106 via an internal network 109. The networked environment 100 also includes one or more computing devices 112 and one or more external computing devices 115, potentially in data communication with the protected computing environment 103 via a network 118. In some embodiments, the external computing device 115 and the computing device 112 may be in data communication via another network 121.

The internal network 109 and the networks 118 and 121 may include, for example, the Internet, intranets, extranets, wide area networks (WANs), local area networks (LANs), wired networks, wireless networks, cable networks, satellite networks, or other suitable networks, etc., or any combination of two or more such networks. The internal network 109 and the networks 118 and 121 may correspond to distinct networks or may overlap to some degree. In some embodiments, the network 121 may correspond to an acoustically coupled network, a radio coupled network, an infrared coupled network, or other network.

The protected computing environment 103 may comprise, for example, a server computer or any other system providing computing capability. Alternatively, the protected computing environment 103 may employ a plurality of computing devices that may be arranged, for example, in one or more server banks or computer banks or other arrangements. Such computing devices may be located in a single installation or may be distributed among many different geographical locations. For example, the protected computing environment 103 may include a plurality of computing devices that together may comprise a hosted or "cloud" computing resource, a grid computing resource, and/or any other distributed computing arrangement. In some cases, the protected computing environment 103 may correspond to an elastic computing resource where the allotted capacity of processing, network, storage, or other computing-related resources may vary over time.

Various applications and/or other functionality may be executed in the protected computing environment 103 according to various embodiments. Also, various data is stored in a data store 124 that is accessible to the protected computing environment 103. The data store 124 may be representative of a plurality of data stores 124 as can be appreciated. The data stored in the data store 124, for example, is associated with the operation of the various applications and/or functional entities described below.

The components executed on the protected computing environment 103, for example, include an active decoy data generation application 127, a central reporting site 130, and other applications, services, processes, systems, engines, or functionality not discussed in detail herein. The active decoy data generation application 127 may be executed to generate and/or deploy active decoy data 133 to various protected computing devices 106 in the internal network 109 of one or more organizations. The active decoy data 133 may fulfill a functional, non-decoy purpose within the protected computing devices 106 or may be deployed purely to serve as a decoy.

The active decoy data 133 may include one or more predetermined features configured to entice an unauthorized individual to access the active decoy data 133. For example, the active decoy data 133 may have a file name, a file size, a file directory location, file permissions, overt security features, plaintext file content, etc., that are selected so as to constitute or at least resemble a program or file that malicious users would like to exfiltrate. In various scenarios, the predetermined features of the active decoy data 133 may make the active decoy data 133 seem as if it would provide access to personal information of users, payment instruments, security credentials, and/or other sensitive information. Alternatively, the predetermined features of the active decoy data 133 may make the active decoy data 133 seem attractive from the standpoint of discovering and exploiting security defenses of the protected computing environment 103.

In some cases, the active decoy data 133 may be generated so as to be specific to the protected computing device 106 upon which it is deployed. In other cases, the active decoy data 133 may be generic to a degree such that it may be deployed on multiple different protected computing devices 106 coupled to the internal network 109. The active decoy data 133 may be deployed to protected computing devices 106 such that external users do not normally have access to the active decoy data 133 via the network 118. Thus, it may be determined that any use of the active decoy data 133 outside of the protected computing device 106 to which it has been deployed may constitute unauthorized or malicious use.

The central reporting site 130 may correspond to one or more services executed to receive alerts or notifications from computing devices 112 identifying incidents of exfiltration of the active decoy data 133. In some cases, the central reporting site 130 may receive such alerts or notifications directly from the computing device 112. In other cases, the central reporting site 130 may receive such alerts or notifications via a remote reporting site 139 of an external computing device 115.

The data stored in the data store 124 includes, for example, active decoy data 133, predefined characteristics 136, and potentially other data. The active decoy data 133 corresponds to decoy data generated by the active decoy data generation application 127 to be deployed to one or more protected computing devices 106. The active decoy data 133 is "active" in the sense that it includes executable instructions that facilitate reporting of its own exfiltration. The executable instructions within the active decoy data 133 may correspond to machine code and/or interpreted code. The active decoy data 133 may correspond to a file such as, for example, an image file, a document, an animation file, an executable file, a script file, an application package, an embedded Flash® object, a macro in a spreadsheet, an email file, and/or other types of files.

Figure 2A:
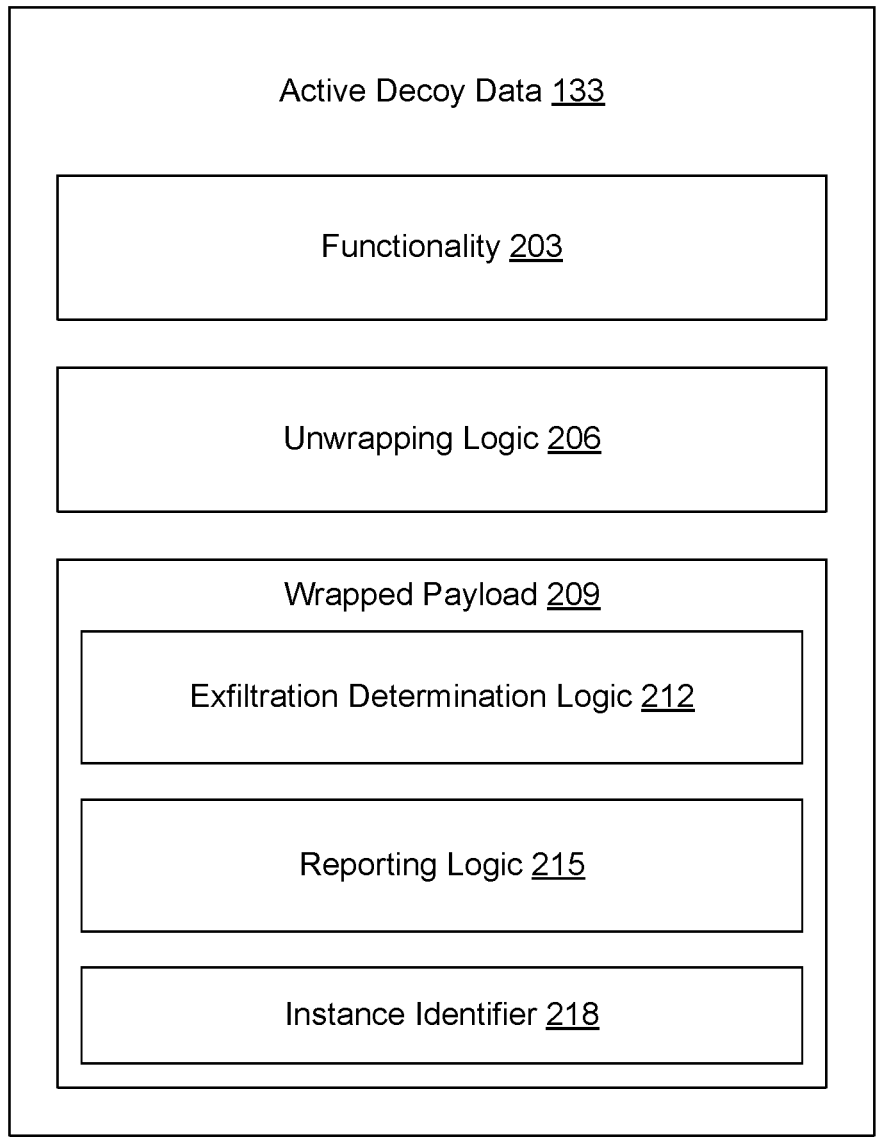
FIG. 2A is a diagram depicting an example of active decoy data according to one embodiment of the present disclosure.

FIG. 2A is a diagram depicting an example of active decoy data 133 according to one embodiment of the present disclosure. In the example of FIG. 2A, the active decoy data 133 includes functionality 203, unwrapping logic 206, and a wrapped payload 209. The functionality 203 may correspond to code and/or data that corresponds to the decoy nature of the active decoy data 133. For example, where the active decoy data 133 corresponds to an image file, the functionality 203 may correspond to the image data. Where the active decoy data 133 corresponds to a server daemon, the functionality 203 may implement the server. In some scenarios, the functionality 203 is absent.

The unwrapping logic 206 may be executed to unwrap the wrapped payload 209, which in turn, may include exfiltration determination logic 212, reporting logic 215, an instance identifier 218, and/or other data. The wrapped payload 209 may be encrypted (e.g., using symmetric or asymmetric cryptography), obfuscated, or otherwise transformed in some way that the content of the wrapped payload 209 is not understandable or is not easily understandable on inspection. Thus, functionality of executable instructions within the wrapped payload may be unidentifiable. For example, the code flow of the wrapped payload 209 may be transformed in such a way that the reporting logic 215 and/or other portions of the wrapped payload 209 are hidden. In certain cases, some or all of the exfiltration determination logic 212, reporting logic 215, or the instance identifier 218 may be unwrapped rather than wrapped within the active decoy data 133. The exfiltration determination logic 212 is executed to determine whether the active decoy data 133 has been exfiltrated, i.e., determine whether the active decoy data 133 is executed upon a different computing device than the protected computing device 106 to which it was deployed. Although the functionality 203 is shown separately in FIG. 2A, it is understood that in some embodiments, all or portions of the functionality 203 may be included within the wrapped payload 209.

The reporting logic 215 is executed in response to determining that exfiltration has occurred. The reporting logic 215 initiates a transmission of an alert or notification to a central reporting site 130 (FIG. 1). The alert or notification may include identifying information to assist investigation of the exfiltration, such as the instance identifier 218 and/or information about the computing device upon which the reporting logic 215 is executed. The instance identifier 218 may uniquely identify the deployment of the active decoy data 133, which may be useful in determining which of the protected computing devices 106 (FIG. 1) has been compromised. In one embodiment, the instance identifier 218 may include a cryptographic signature. It is noted that various data or code within the active decoy data 133 may be disguised via various steganographic techniques such as, for example, image steganography, audio steganography, and so on.

Returning to FIG. 1, the predefined characteristics 136 may correspond to particular device or platform characteristics tied to the deployment of the active decoy data 133. The active decoy data 133 may determine that it has been exfiltrated based upon the absence of or a modification to the predefined characteristics 136. The predefined characteristics 136 may comprise a particular predefined file, a particular predefined file that has been modified in a specific way, a predefined registry flag, or other data indicative of the protected computing device 106 to which the active decoy data 133 has been deployed. In one example, the predefined characteristics 136 may correspond to a commonly available file that has been modified in a specific way.

In some scenarios, the predefined characteristics 136 may correspond to a particular device configuration (e.g., presence of a trusted platform module, absence of a particular type of hardware, and so on). In other scenarios, the predefined characteristics 136 may include the ability of the device to communicate with a predefined network endpoint via the internal network 109 (or that a predefined network endpoint should not be reachable). In still other scenarios, the predefined characteristics 136 may define a particular type of sound expected or not expected to be detected via a sound capture device, a particular type of image expected or not expected to be detected via an image capture device, and so on. For example, for a protected computing device 106 deployed in a conference room, a webcam or microphone of the device may expect to capture a certain image or detect a certain range of sounds, and detection of images or sounds outside that expected may be an indication that the active decoy data 133 has been exfiltrated. In another scenario, the predefined characteristics 136 may correspond to a particular network configuration (e.g., a set of wireless access points that are visible, a set of personal area network devices in range, a near-field communication device expected to be in range, and so on).

Each of the protected computing devices 106 may comprise, for example, a server computer, a client computer, or any other system providing computing capability. The protected computing devices 106 may be protected in the sense that they are behind a firewall, limited for access by certain users, or otherwise store protected data that is not intended to be publicly accessible. The protected computing devices 106 may correspond to computing devices within the protected computing environment 103 or may be coupled to the protected computing environment 103 and/or each other via the internal network 109. Such protected computing devices 106 may be located in a single installation or may be distributed among many different geographical locations. For example, the protected computing devices 106 may include a plurality of computing devices that together may comprise a hosted or "cloud" computing resource, a grid computing resource, and/or any other distributed computing arrangement. In some cases, the protected computing devices 106 may correspond to an elastic computing resource where the allotted capacity of processing, network, storage, or other computing-related resources may vary over time.

Various applications and/or other functionality may be executed in the protected computing devices 106 according to various embodiments. Also, various data may be stored in a data store that is accessible to the protected computing devices 106. The components deployed to or executed in the protected computing devices 106, for example, include a deployment of active decoy data 133 and predefined characteristics 136.

The computing device 112 and the external computing device 115 may comprise, for example, a server computer, a client computer, or any other system providing computing capability. For example, the computing device 112 and the external computing device 115 may comprise a desktop computer, a laptop computer, personal digital assistants, cellular telephones, smartphones, set-top boxes, music players, web pads, tablet computer systems, game consoles, electronic book readers, or other devices with like capability.

Various applications and/or other functionality may be executed in the computing device 112 and the external computing device 115 according to various embodiments. Also, various data may be stored in a data store that is accessible to the computing device 112 and the external computing device 115. The data stored in the data store may be associated with the operation of the various applications and/or functional entities described below. The components executed on computing device 112 and the external computing device 115, for example, include exfiltrated active decoy data 142, applications 145, a remote reporting site 139, and other applications, services, processes, systems, engines, or functionality not discussed in detail herein.

The computing device 112 represents a device upon which exfiltrated active decoy data 142 is present. In some embodiments, the computing device 112 may be an external computing device 112 that is unauthorized to receive the exfiltrated active decoy data 142. In other embodiments, the computing device 112 may be coupled to the internal network 109 but may still be unauthorized to receive the exfiltrated active decoy data 142. The exfiltrated active decoy data 142 corresponds to active decoy data 133 that has been obtained in an unauthorized manner from its originally deployed environment. The computing device 112 may have various applications 145 installed, such as web browsers, contact management applications, email applications, social networking applications, word processors, spreadsheets, and/or other applications. Additionally, various user data 148 may be stored upon or may be otherwise accessible by the computing device 112.

The external computing device 115 represents a device upon which services implementing the remote reporting site 139 have been deployed. The remote reporting site 139 may be configured to receive notifications or alerts via the network 121 from the exfiltrated active decoy data 142 upon the computing device 112. In turn, the remote reporting site 139 may transmit the notifications or alerts to the central reporting site 130. In one embodiment, the remote reporting site 139 may be executed upon the same computing device 112 as the exfiltrated active decoy data 142. For example, the remote reporting site 139 may be implemented by logic embedded in widely distributed software. The remote reporting site 139 may silently listen for communications from exfiltrated active decoy data 142 and then report back to the central reporting site 130. In one embodiment, the computing device 112 may be "air gapped" from the network 118, and the network 121 may represent an acoustically coupled network, a radio coupled network, an infrared network, and/or another type of network.

Next, a general description of the operation of the various components of the networked environment 100 is provided. To begin, the protected computing environment 103, the protected computing devices 106, and the internal network 109 may be configured using industry best practices in order to avoid unauthorized access and exfiltration of data. Alternatively, one or more of the protected computing devices 106 may be maintained with various vulnerabilities as a honeypot to attract would-be attackers.

The active decoy data generation application 127 is executed to generate and deploy active decoy data 133 to various protected computing devices 106. In one non-limiting example, the active decoy data generation application 127 edits an email message to include active decoy data 133 in response to a user selecting a component within an email reader. It is noted that multiple different types of active decoy data 133 may be deployed. The active decoy data 133 may be generated so as to be attractive to would be attackers. For example, it may appear that the active decoy data 133 provides access to important information, such as financial information, personal information, company confidential information, and so on. Alternatively, the active decoy data 133 may appear to be an important file developed by the organization associated with the protected computing environment 103. In any case, the active decoy data 133 may be deployed with an intent to attract exfiltration by users having access to the system to which it has been deployed. In one embodiment, the active decoy data 133 may be generated so that each instance of the active decoy data 133 is unique and dissimilar. Ultimately, the active decoy data 133 may be generated such that it is not apparent which files correspond to active decoy data 133 and which files do not.

In its originally deployed environment, the active decoy data 133 may execute functionality 203 (FIG. 2A) that is useful to some end. The active decoy data 133 verifies that its execution environment embodies some predefined characteristic in the exfiltration determination logic 212 (FIG. 2A). In the ordinary case within the originally deployed environment, the active decoy data 133 does not invoke the reporting logic 215 (FIG. 2A). However, if the active decoy data 133 determines that exfiltration has occurred, the reporting logic 215 may be invoked to report identifying information to the central reporting site 130 in order to aid in an investigation. The report or notification may indicate uniquely identifying information for the deployment. The central reporting site 130 may take various actions in response to receiving such notifications. For example, the central reporting site 130 may disable affected protected computing devices 106, quarantine affected protected computing devices 106, disable account access for user accounts associated with the exfiltration, send notifications to system administrators, send notification to law enforcement, and/or perform other actions.

In some situations, the active decoy data 133 may be unable to report directly back to the central reporting site 130. In such situations, the active decoy data 133 may instead report to a remote reporting site 139. In one embodiment, the remote reporting site 139 may be embodied within widely distributed software and accessible via a broadcast packet on a local network 121, an acoustic signal sent via an acoustic network 121, a radio signal sent via a radio network 121, and/or other approaches. The remote reporting site 139 may be configured to forward the notification to other remote reporting sites 139 and/or the central reporting site 130.

In one non-limiting example, the unwrapping logic 206 may function as follows. Assuming that the data segment of the active decoy data 133 is executable, the instruction pointer may be replaced with a value that is characteristic to the protected computing device 106 upon which it is intended to be executed. For example, the value may depend on a unique hardware identifier of the protected computing device 106. When the unwrapping logic 206 executes, it may use an XOR function or other function to determine a memory value based upon the instruction pointer and the current hardware identifier of the device upon which the unwrapping logic 206 is executed. When the device is the protected computing device 106, the instruction pointer then points to a particular memory address of the active decoy data 133 that corresponds to the functionality 203. When the device is not the protected computing device 106, the instruction pointer may then point to a memory address that is out-of-bounds. This action may result in an exception handler being invoked, which may then execute the reporting logic 215.

Although the present disclosure primarily discusses active decoy data 133, it is noted that passive decoy data may also be generated and deployed to the protected computing devices 106. In some embodiments, the active decoy data 133 may also include sentinel service functionality to scan for passive decoy data.

Figure 2B:
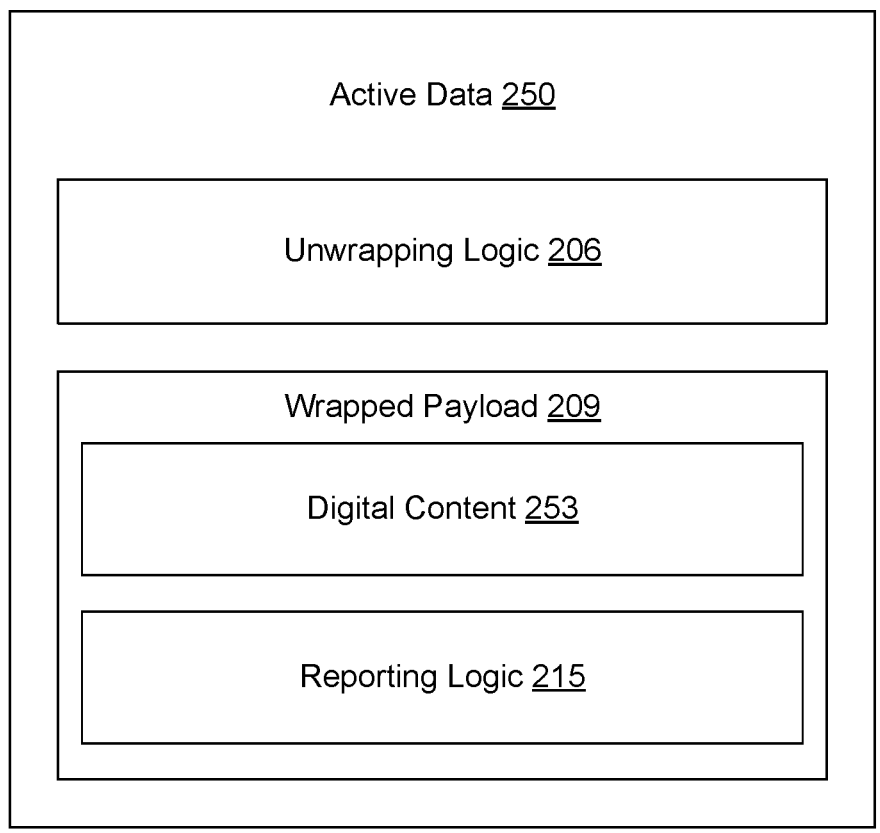
FIG. 2B is a diagram depicting an example of active data according to one embodiment of the present disclosure.

FIG. 2B is a diagram depicting an example of active data 250 according to one embodiment of the present disclosure. It is recognized that the principles described herein may have application beyond the context of decoy data and identifying malicious activity. To this end, the approaches to data wrapping of the present disclosure may be employed in a digital content distribution system. In the example of FIG. 2B, the active data 250 includes unwrapping logic 206 and a wrapped payload 209. The wrapped payload 209 may include digital content 253, reporting logic 215, and/or other data.

The digital content 253 may correspond to news stories, books, articles, video features, audio files, games, software programs, and/or other forms of digital content 253. In unwrapping the wrapped payload 209, the unwrapping logic 206 may unwrap a portion of the digital content 253 along with a portion of the reporting logic 215. As portions of the digital content 253 are unwrapped, portions of the reporting logic 215 may be executed. By the time that the digital content 253 is fully unwrapped, the entirety of the reporting logic 215 may be executed. The reporting logic 215 may be configured, for example, to report data relevant to advertisers. In other embodiments, advertising logic and/or other logic may be executed as the wrapped payload 209 is unwrapped.

As compared to the active decoy data 133 (FIG. 2A), both the active decoy data 133 and the active data 250 are intended to be publicly distributed, where at least a portion of the wrapped payload 209 is intended to be hidden or obfuscated from the user who obtains it. Both the active decoy data 133 and the active data 250 are intended to be fully executed and available when unwrapped by the user. Thus, the wrapping involved is of a temporary nature, and the content of the wrapped payload 209 is intended ultimately to be made available to the user, so that the reporting logic 215 and/or other logic is executed by the computing device 112 (FIG. 1).

Figure 3:
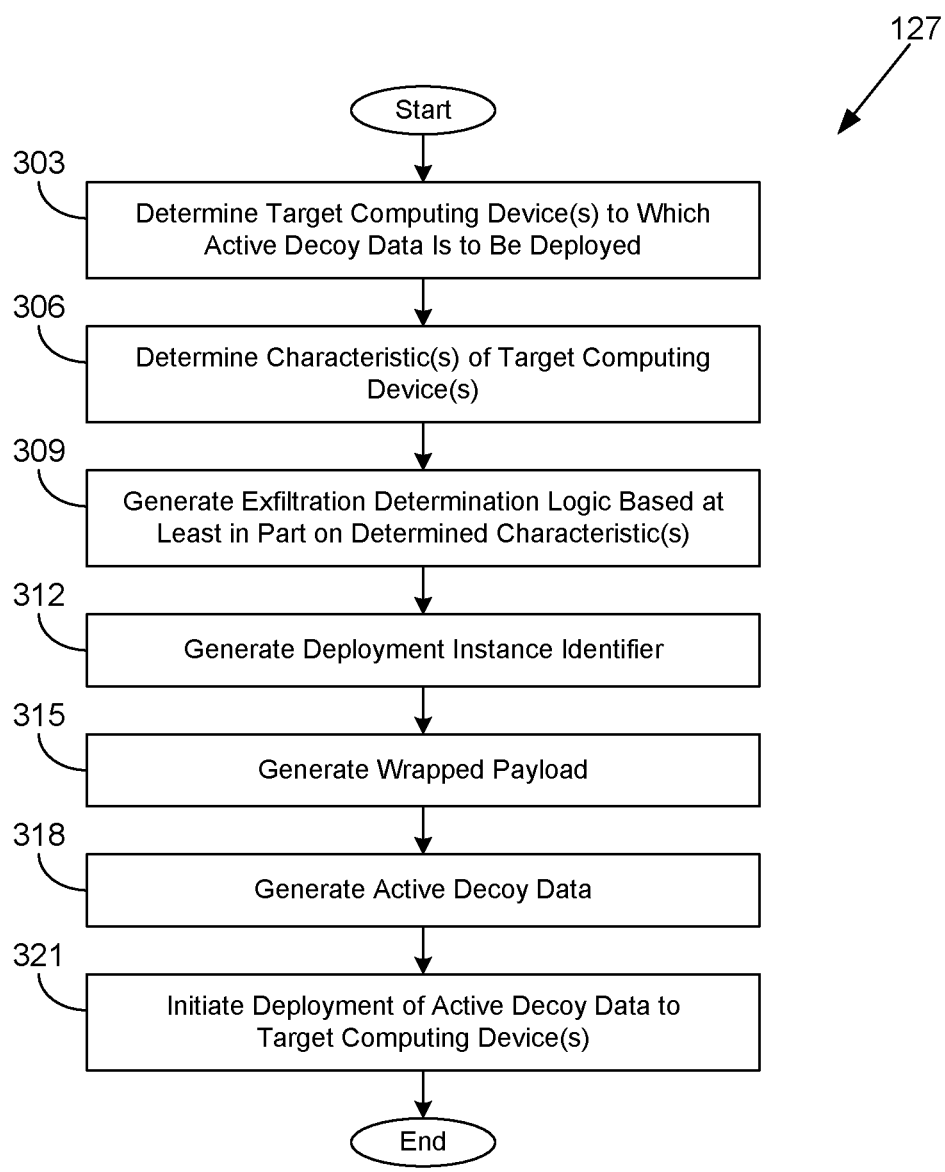
FIG. 3 is a flowchart illustrating one example of functionality implemented as portions of an active decoy data generation application executed in a computing environment in the networked environment of FIG. 1 according to various embodiments of the present disclosure.

Referring next to FIG. 3, shown is a flowchart that provides one example of the operation of a portion of the active decoy data generation application 127 according to various embodiments. It is understood that the flowchart of FIG. 3 provides merely an example of the many different types of functional arrangements that may be employed to implement the operation of the portion of the active decoy data generation application 127 as described herein. As an alternative, the flowchart of FIG. 3 may be viewed as depicting an example of elements of a method implemented in the protected computing environment 103 (FIG. 1) according to one or more embodiments.

Beginning with box 303, the active decoy data generation application 127 determines one or more target computing devices, such as protected computing devices 106 (FIG. 1), to which the active decoy data 133 (FIG. 1) is to be deployed. The target computing devices may be manually determined or may be automatically determined via a scan of the internal network 109 (FIG. 1) or via other information automatically provided to the active decoy data generation application 127.

In box 306, the active decoy data generation application 127 determines one or more characteristics of the target computing device(s). Such characteristics may be already present upon the target computing device(s) or may be present upon deployment. For example, a particular registry flag may be set in a protected computing device 106. In some situations, a characteristic may correspond to an absence of a file, a registry flag, or other data that ordinarily would be present in the environment upon which the active decoy data 133 is to be deployed.

In box 309, the active decoy data generation application 127 generates exfiltration determination logic 212 (FIG. 2A) based at least in part on the determined characteristic(s). The exfiltration determination logic 212 is configured to determine whether the particular characteristic(s) are present in the environment in which the exfiltration determination logic 212 is executed. In some embodiments, the active decoy data 133 is not generated based upon predefined characteristics 136 (FIG. 1); in such cases, the characteristics may be assessed dynamically at runtime. In some cases, the characteristics may be assessed by the central reporting site 130, the remote reporting site 139 (FIG. 1), or other services based upon data reported by the exfiltration determination logic 212. Consequently, the exfiltration determination logic 212 may receive the determination from a network service. In box 312, the active decoy data generation application 127 generates a deployment instance identifier 218 (FIG. 2A) that uniquely identifies the deployment.

In box 315, the active decoy data generation application 127 generates the wrapped payload 209 (FIG. 2A). In box 318, the active decoy data generation application 127 generates the active decoy data 133 including the wrapped payload 209. In box 321, the active decoy data generation application 127 initiates deployment of the generated active decoy data 133 to the target computing device(s). For example, the active decoy data generation application 127 may transfer or schedule a transfer of the generated active decoy data 133 to a particular protected computing device 106. Thereafter, the portion of the active decoy data generation application 127 ends.

Figure 4A:
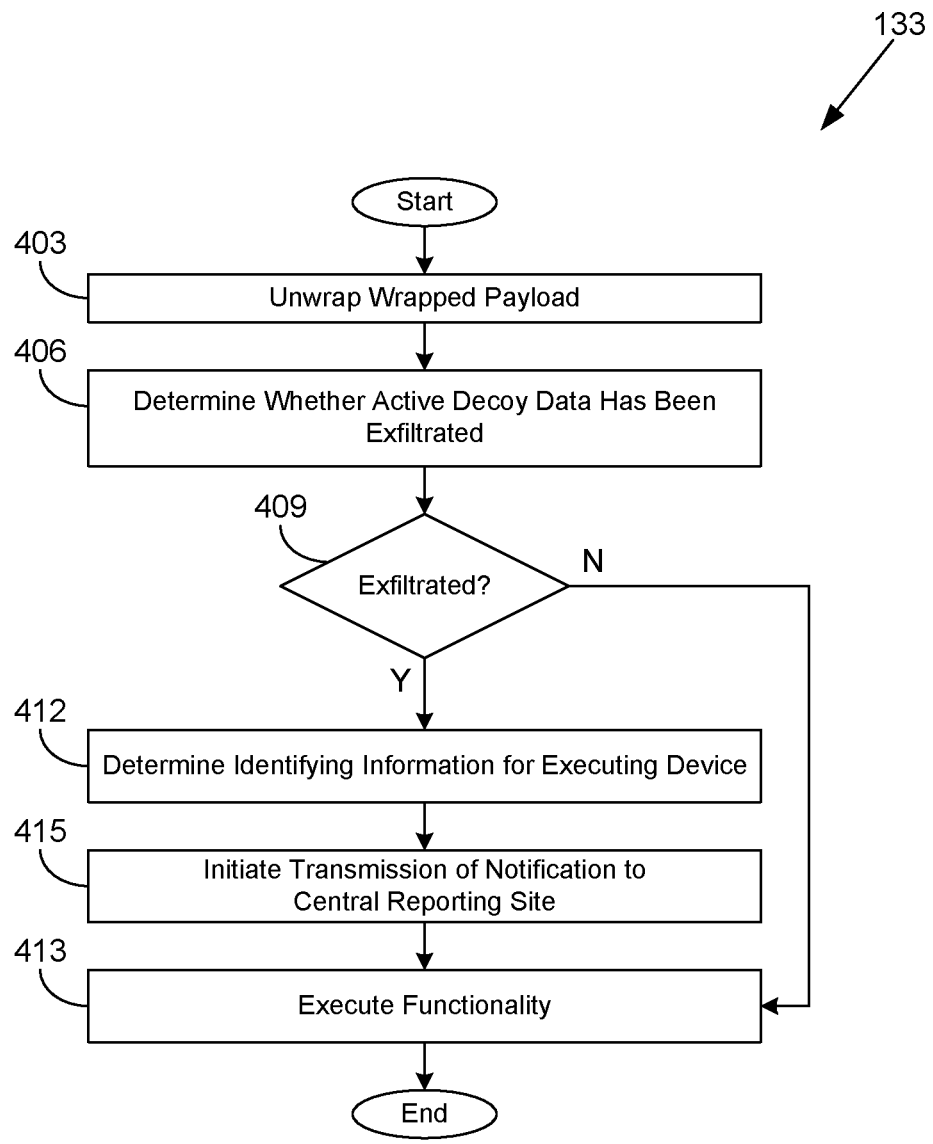
FIG. 4A is a flowchart illustrating one example of functionality implemented as portions of active decoy data executed in a computing device in the networked environment of FIG. 1 according to various embodiments of the present disclosure.

Turning now to FIG. 4A, shown is a flowchart that provides one example of the operation of a portion of the active decoy data 133 according to various embodiments. It is understood that the flowchart of FIG. 4A provides merely an example of the many different types of functional arrangements that may be employed to implement the operation of the portion of the active decoy data 133 as described herein. As an alternative, the flowchart of FIG. 4A may be viewed as depicting an example of elements of a method implemented in the computing device 112 (FIG. 1) or the protected computing device 106 (FIG. 1) according to one or more embodiments.

As an initial matter, the active decoy data 133 may be executed in a variety of ways, with both conscious and unconscious triggers. For example, a user may consciously download and execute the active decoy data 133. By contrast, unconscious triggers may involve automatic execution triggered by some agent that may already be deployed to the computing device 112. For example, the active decoy data 133 may be configured to execute in response to an anti-virus scan performed by a particular anti-virus scanning tool. Unconscious triggers may include both accidental and incidental triggers.

Beginning with box 403, the active decoy data 133 executes the unwrapping logic 206 (FIG. 2A) in order to unwrap the wrapped payload 209 (FIG. 2A). The wrapped payload 209 may, for example, contain exfiltration determination logic 212 (FIG. 2A), reporting logic 215 (FIG. 2A), an instance identifier 218 (FIG. 2A), and/or other data. In some embodiments, one or more of the exfiltration determination logic 212, the reporting logic 215, or the instance identifier 218 may be unencrypted within the active decoy data 133. In some embodiments, the active decoy data 133 may execute initial functionality 203 (FIG. 2A).

In box 406, the active decoy data 133 determines whether it has been exfiltrated. For example, the active decoy data 133 may examine the environment in which it is executed to determine whether one or more characteristics of the device to which it was deployed is present. Such characteristics may comprise the presence or absence of predefined characteristics 136 (FIG. 1) such as, for example, a predefined file, a predefined registry flag, a predefined modification to a file, a type of image expected to be captured via a camera, a network host expected to be unreachable via the internal network 109 (FIG. 1), and/or other characteristics. In some cases, the active decoy data 133 may communicate with a network service in order to make the exfiltration determination. For example, the active decoy data 133 may present certain identifying information gleaned from the execution environment, and the network service may return a result that indicates whether the exfiltration has occurred based at least in part on the identifying information.

In box 409, if the active decoy data 133 determines that exfiltration has occurred, the active decoy data 133 proceeds from box 409 to box 412. If instead, the active decoy data 133 determines that exfiltration has not occurred, the active decoy data 133 instead proceeds from box 409 to box 413. In some embodiments, the exfiltration determination may be implicit. For example, the active decoy data 133 may be configured to throw an exception due to an instruction pointer pointing out of bounds when the active decoy data 133 is executed on a device other than the target device. The exception handler may then perform the reporting functions.

In box 412, the active decoy data 133 determines identifying information for the computing device 112 (FIG. 1) upon which the active decoy data 133 is executed. For example, the active decoy data 133 may determine an IP address, geographic coordinates, contact information, installed applications 145 (FIG. 2A), information from the user data 148 (FIG. 1), and/or other data that may be used to identify the computing device 112 or the operator of the computing device 112. In box 415, the active decoy data 133 initiates a predefined action, such as a transmission of a notification or alert to a central reporting site 130 (FIG. 1). For example, the active decoy data 133 may send a "beacon" of information back to the central reporting site 130 via the network 118 (FIG. 1). The information may include the identifying information for the computing device 112 and potentially the instance identifier 218 or other information that uniquely identifies the original deployment of the active decoy data 133.

The active decoy data 133 may send the "beacon" of information to a remote reporting site 139 (FIG. 1) if, for example, the central reporting site 130 is inaccessible to the computing device 112. In one embodiment, the computing device 112 is not connected to, or is no longer connected to, the network 118. The computing device 112 may be said to be "air gapped" from the network 118. In such an embodiment, the active decoy data 133 may emit the "beacon" of information via a speaker, where the notification or alert data is encoded within an acoustic signal.

The remote reporting site 139 may listen via a microphone for such acoustic signals and then report back to central reporting site 130 via the network 118. In some cases, the information may be relayed in a peer-to-peer fashion until the information is finally relayed via the network 118 to the central reporting site 130. Infrared, radio, and/or other transmissions may be made in lieu of acoustic coupling. In some situations, the remote reporting site 139 and/or the computing device 112 may be temporarily disconnected from the network 118 and may store the notification or alert to be relayed upon restoration of the connection to the network 118.

In one embodiment, the active decoy data 133 may initiate the transmission of the notification by way of effecting a predefined change to a processing state or a memory state of the computing device 112 upon which it is executed. For example, the active decoy data 133 may use a certain percentage of processing or memory resources over time, and this signal may correspond to an alert. Services implementing the remote reporting site 139 may be executed in the computing device 112, listening for the signal via the processing and/or memory state. The services implementing the remote reporting site 139 may then, upon detection of the alert signal, relay a notification to the central reporting site 130 or to another remote reporting site 139.

In box 413, the active decoy data 133 executes the functionality 203. In some scenarios, the active decoy data 133 may erase or otherwise disable access to protected content or functionality 203 within the active decoy data 133. Thereafter, the portion of the active decoy data 133 ends.

Figure 4B:
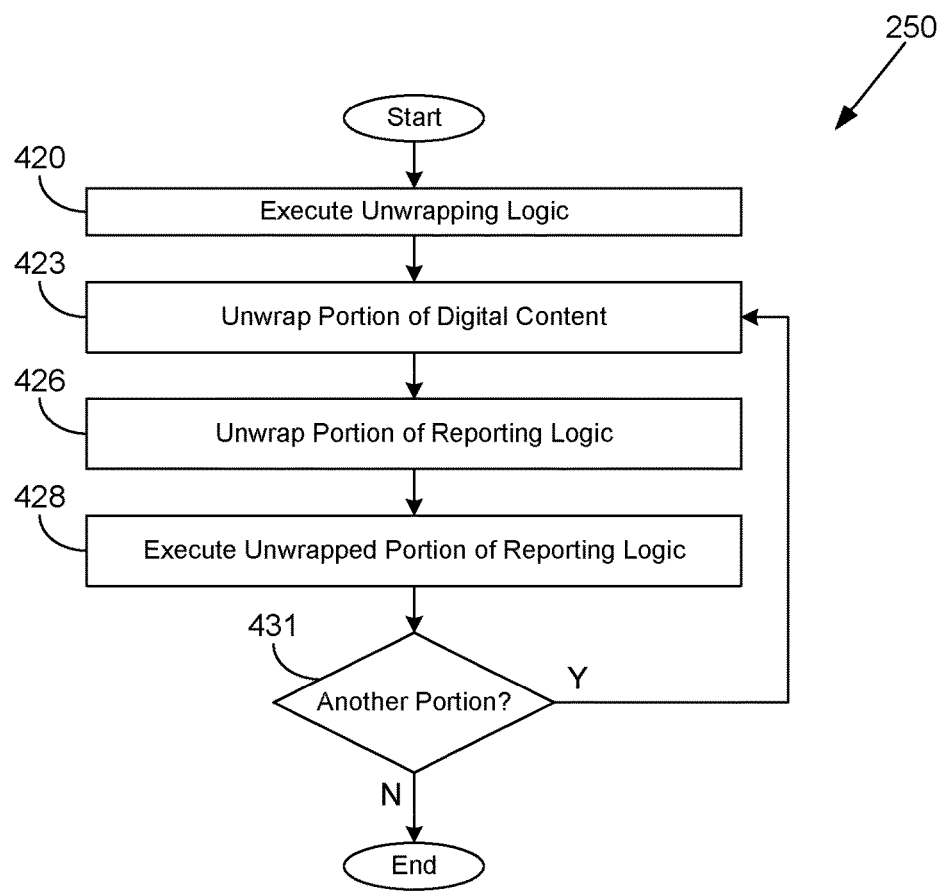
FIG. 4B is a flowchart illustrating one example of functionality implemented as portions of active data executed in a computing device in the networked environment of FIG. 1 according to various embodiments of the present disclosure.

Moving on to FIG. 4B, shown is a flowchart that provides one example of the operation of a portion of the active data 250 according to various embodiments. It is understood that the flowchart of FIG. 4B provides merely an example of the many different types of functional arrangements that may be employed to implement the operation of the portion of the active data 250 as described herein. As an alternative, the flowchart of FIG. 4B may be viewed as depicting an example of elements of a method implemented in the computing device 112 (FIG. 1) or the protected computing device 106 (FIG. 1) according to one or more embodiments.

Beginning with box 420, the active data 250 executes the unwrapping logic 206 (FIG. 2B). In box 423, the unwrapping logic 206 unwraps a portion of the digital content 253 and makes the portion available to a user. In box 426, the unwrapping logic 206 unwraps a portion of the reporting logic 215 (FIG. 2B). In box 428, the active data 250 executes the unwrapped portion of the reporting logic 215 (FIG. 2B) to perform a business or reporting function relating to making the portion of the digital content 253 available. In box 431, the active data 250 determines whether another portion of the wrapped payload 209 (FIG. 2B) remains to be unwrapped. If so, the active data 250 returns to box 423. If not, the portion of the active data 250 ends.

Figure 5:
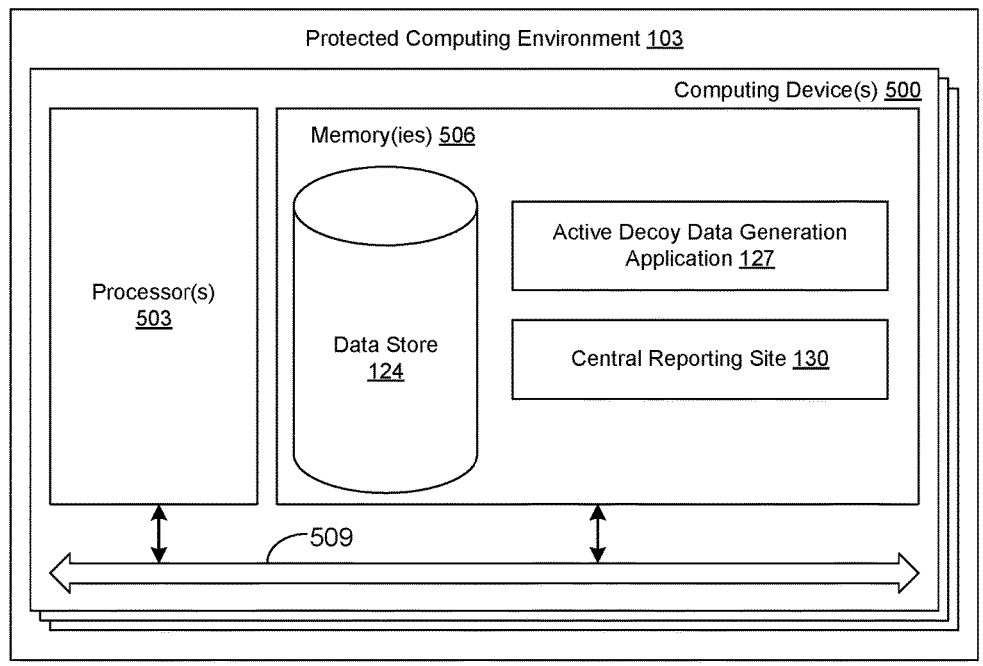
FIG. 5 is a schematic block diagram that provides one example illustration of a computing environment employed in the networked environment of FIG. 1 according to various embodiments of the present disclosure.

With reference to FIG. 5, shown is a schematic block diagram of the protected computing environment 103 according to an embodiment of the present disclosure. The protected computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated. A computing device 500 may similarly represent a protected computing device 106 (FIG. 1) or a computing device 112 or 115 (FIG. 1) as can be appreciated.

Stored in the memory 506 are both data and several components that are executable by the processor 503. In particular, stored in the memory 506 and executable by the processor 503 are the active decoy data generation application 127, the central reporting site 130, and potentially other applications. Also stored in the memory 506 may be a data store 124 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the active decoy data generation application 127, the central reporting site 130, the remote reporting site 139 (FIG. 1), the active decoy data 133 (FIG. 2A), the active data 250 (FIG. 2B), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-4B show the functionality and operation of an implementation of portions of the active decoy data generation application 127, the active data 250, and the active decoy data 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4B show a specific order of execution, it is understood that the order of execution may differ from that which is depicted. For example, the order of execution of two or more blocks may be scrambled relative to the order shown. Also, two or more blocks shown in succession in FIGS. 3-4B may be executed concurrently or with partial concurrence. Further, in some embodiments, one or more of the blocks shown in FIGS. 3-4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the active decoy data generation application 127, the central reporting site 130, the remote reporting site 139, the active data 250, and the active decoy data 133, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the active decoy data generation application 127, the central reporting site 130, the remote reporting site 139, the active data 250, and the active decoy data 133, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same protected computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying active data, wherein the active data causes a particular computing device to at least:
   automatically execute a subset of the active data, wherein the active data comprises a trigger that causes the subset of the active data to automatically execute in response to an anti-virus scan performed on the particular computing device, wherein the trigger is unconscious with respect to a user of the particular computing device, and wherein the subset of the active data causes the particular computing device to at least:
      unwrap a payload included in the active data, the payload comprising a reporting functionality and protected content;
      scan the particular computing device to identify at least one characteristic of the particular computing device;
      determine that the active data is exfiltrated from a protected computing device based at least in part on an absence of a predefined registry flag setting of the particular computing device, wherein the predefined registry flag setting is a characteristic of the protected computing device;
      disable access to the protected content based at least in part on the usage of the active data being unauthorized; and
      transmit a notification to a central reporting site, the notification comprising identifying information for the particular computing device, and data that uniquely identifies a particular deployment of the active data.

2. The non-transitory computer-readable medium of claim 1, wherein the active data causes the particular computing device to at least erase the protected content to disable access to the protected content.

3. The non-transitory computer-readable medium of claim 1, wherein the reporting functionality is obfuscated using at least one of image steganography or audio steganography.

4. The non-transitory computer-readable medium of claim 1, wherein the active data is deployed by a digital content distribution system and wherein the protected content is digital content.

5. The non-transitory computer-readable medium of claim 4, wherein the digital content is at least one of a book, an article, a video feature, an audio file, or a software program.

6. The non-transitory computer-readable medium of claim 1, wherein the anti-virus scan is performed by a particular anti-virus scanning tool.

7. A system, comprising:
   a computing device;
   a data store comprising active data; and
   active data comprising a trigger that is unconscious with respect to a user, wherein the trigger causes a subset of the active data to automatically execute based at least in part on an anti-virus scan performed on the computing device, wherein when executed by the computing device, the subset of the active data causes the computing device to at least:
      unwrap a payload included in the active data, the payload comprising a reporting functionality;
      identify at least one characteristic of the computing device;
      determine that the active data is exfiltrated from a protected computing device based at least in part on an absence of a predefined registry flag setting of the computing device, wherein the predefined registry flag setting is a characteristic of the protected computing device; and
      transmit a notification to a network service, the notification comprising identifying information for the computing device, and data that uniquely identifies a particular deployment of the active data.

8. The system of claim 7, wherein the payload further includes digital content comprising at least one of a book, an article, a video feature, an audio file, or a software program.

9. The system of claim 8, wherein when executed, the active data further causes the computing device to at least disable access to digital content within the payload based at least in part on the usage of the active data being unauthorized.

10. The system of claim 8, wherein when executed, the active data further causes the computing device to at least provide access to digital content within the payload.

11. The system of claim 8, wherein the anti-virus scan is performed by a particular anti-virus scanning tool.

12. The system of claim 7, wherein the active data includes data that is obfuscated using steganography.

13. The system of claim 7, wherein when executed, the active data further causes the computing device to at least execute advertising functionality as the payload is unwrapped, the advertising functionality being included in the payload.

14. The system of claim 7, wherein the active data further includes a cryptographic signature that uniquely identifies a particular deployment of the active data.

15. A method, comprising:
   automatically executing a subset of active data, wherein the active data comprises a trigger that is unconscious with respect to a user, the trigger causing the subset of the active data to automatically execute based at least in part on an anti-virus scan performed on a computing device;

unwrapping, by the subset of the active data executed in the computing device, a payload included within the active data, the payload comprising a reporting functionality and protected content;

scanning, by the subset of the active data executed in the computing device, the computing device to identify at least one characteristic of the computing device;

transmitting, by the subset of the active data executed in the computing device, data comprising the at least one characteristic of the computing device, and data that uniquely identifies a particular deployment of the active data, to a network service;

receiving, by the subset of the active data executed in the computing device, an assessment of the at least one characteristic of the computing device from the network service;

determining, by the subset of the active data executed in the computing device, that the active data is exfiltrated from a protected computing device based at least in part on the assessment of the at least one characteristic of the computing device, the at least one characteristic of the computing device comprising an absence of a predefined registry flag setting, wherein the predefined registry flag setting is a characteristic of the protected computing device; and disabling, by the active data executed in the computing device, access to the protected content in response to the usage of the active data being unauthorized.

16. The method of claim 15, wherein the active data includes data that is obfuscated using steganography.

17. The method of claim 15, wherein the protected content comprises at least one of: a document, an image file, an animation file, an executable file, a script file, an application package, or an email file.

18. The method of claim 15, wherein the at least one characteristic of the computing device further comprises a particular type of sound detected using a sound capture device of the computing device, wherein the assessment is based at least in part on the particular type of sound and the absence of the predefined registry flag setting, and wherein the particular type of sound is expected in an environment of the protected computing device.

19. The method of claim 15, further comprising performing, by the active data executed in the computing device, advertising functionality as the payload is unwrapped.

20. The method of claim 15, wherein the active data further includes a cryptographic signature that uniquely identifies a particular deployment of the active data.

* * * * *